(No Model.)
J. E. & E. M. MITCHELL.
PLOW.
No. 467,946. Patented Feb. 2, 1892.
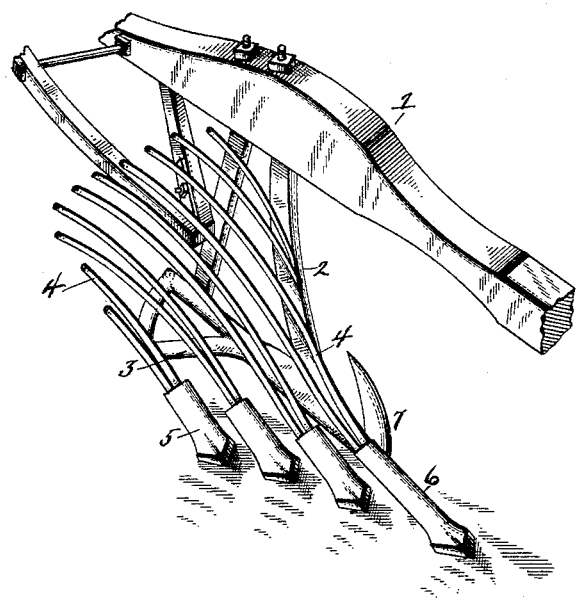
WITNESSES:
Albert B. Blackwood.
Wm H. Bates
INVENTORS.
John E. Mitchell
Elma M. Mitchell
BY
F. O. McCleary
ATTORNEY.

UNITED STATES PATENT OFFICE.

JOHN E. MITCHELL AND ELMA M. MITCHELL, OF SALEM, IOWA.

PLOW.

SPECIFICATION forming part of Letters Patent No. 467,946, dated February 2, 1892.

Application filed January 27, 1891. Serial No. 379,281. (No model.)

*To all whom it may concern:*

Be it known that we, JOHN E. MITCHELL and ELMA M. MITCHELL, citizens of the United States, and residents of Salem, in the county of Henry and State of Iowa, have invented certain new and useful Improvements in Plows, of which the following is a specification.

Our invention relates to an improvement in plows, the object being to provide a plow adapted for use in thick waxy soil.

The invention consists in the features of construction hereinafter fully described, and pointed out in the claim.

The accompanying drawing represents our improved plow in perspective.

1 represents the plow-beam, and 2 the standard secured to the beam and provided with any suitable form of brace or support 3, to which we secure a series of rods or bars 4, preferably arranged in pairs, which are brought together at their points to receive sharpened ends or shovels 5. The front prong or shovel 6 is provided with a projecting cutter 7 to cut the weeds or grass.

The construction thus described presents a series of disconnected points as a cutting-edge, and reduces the amount of friction against the ground in plowing, and it is specially designed for use in waxy soils.

We claim—

The combination, with a plow-beam and a standard, of a mold-board consisting of a series of rods or bars braced to the standard and provided with prongs or sharpened points disconnected from one another, substantially as set forth.

In witness whereof we have hereto set our hands in the presence of two attesting witnesses.

JOHN E. MITCHELL.
ELMA M. MITCHELL.

Attest:
 IRA MITCHELL,
 O. H. MITCHELL.